(No Model.)
M. F. GRAHAM & O. E. NORTH.
MOTOR.
No. 332,249. Patented Dec. 15, 1885.
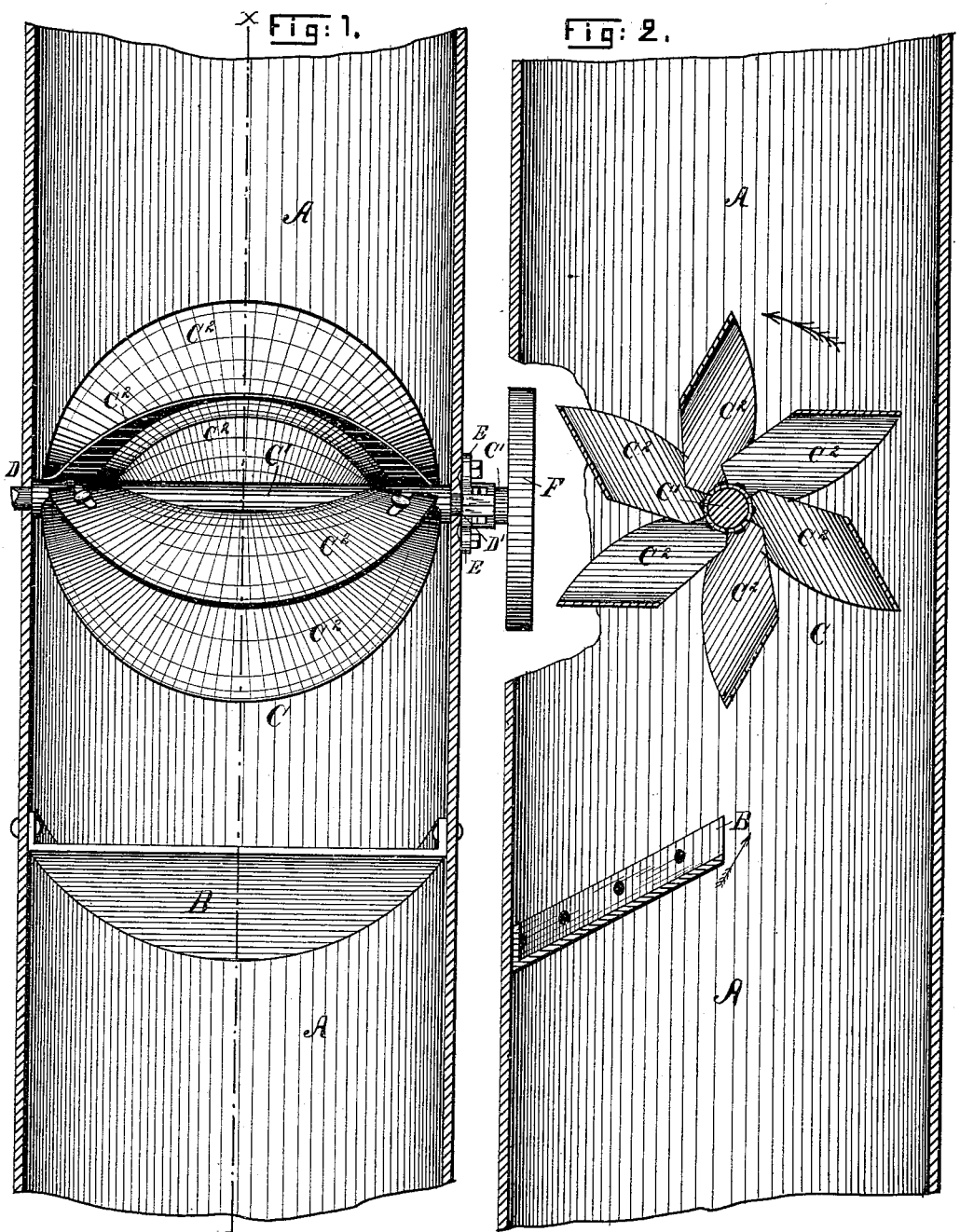

UNITED STATES PATENT OFFICE.

MARTIN F. GRAHAM AND OWEN E. NORTH, OF SPRINGFIELD, OHIO.

MOTOR.

SPECIFICATION forming part of Letters Patent No. 332,249, dated December 15, 1885.

Application filed September 1, 1884. Serial No. 141,909. (No model.)

*To all whom it may concern:*

Be it known that we, MARTIN F. GRAHAM and OWEN E. NORTH, of the city of Springfield, county of Clark, and State of Ohio, have invented certain new and useful Improvements in Motors, of which the following is a specification.

This invention relates to motors, the object of the invention being to provide a motor to be used in stove-pipes, flues, and smoke-shafts of all kinds, to be operated by draft, said motor being so constructed and arranged as to be capable of running various kinds of machinery, automatic toys, &c.

This invention consists in certain details of construction and arrangement of parts of the motor, substantially as hereinafter described.

Figure 1 represents in longitudinal section a portion of a stove-pipe as provided with our invention. Fig. 2 is a vertical cross-section of the motor on dotted line $x\ x$, Fig. 1.

In the construction of our invention the pipe or flue A is and may be of any desired construction, it being herein shown as a stove-pipe, the lower end of which is provided with an air-deflector, B, extending at an angle from the sides of the pipe to a point midway, or nearly so, of its diameter.

At a desired distance above the lower end of the pipe A is a motor or wind wheel, C. The motor C consists of a shaft, C′, which is preferably of metal, extending through and having its bearing in the sides of the pipe or flue A at D D′, and wings or arms $C^2$, bolted or otherwise attached to the said shaft. The wings or arms $C^2$ are bowed out and externally shaped to correspond to the circular shape of the stove-pipe—that is to say, the wheel in side elevation will be circular in shape, as shown in Fig. 1.

The wheel-wings may be of many shapes; but the shape shown in the drawings is preferable, as the wings act to cut the air, and the air, should it pass one wing, will strike the wing opposite.

The shaft C′ extends through the sides of the pipe, in which it has its bearing, the said pipe being preferably provided with journal-boxes E. At each end of the shaft C′, on the outside of the pipe, is a pulley, F, said pulley being of any ordinary construction, from which a belt extends to the machine or device to be operated.

As will be seen, the air passes into the pipe at its lower end, as shown by arrows, the deflector B directing its course to strike the wheel at the proper point.

The wheel C, revolving on a horizontal axis and being of the shape shown, revolves readily, and when used with large smoke-shafts— such as furnace-shafts—the draft of air being very great, the wheel or motor is adapted to create sufficient power to operate more or less machinery.

We do not desire to limit ourselves to any special construction of wheel, or to its location upon the inside of the smoke-shaft. Nor do we desire to limit ourselves to any special construction of shaft, as it might be used in shafts of mines and other similar places.

We are aware that wind-wheels have been used at the top of smoke-flues, upon the outside, to create a draft, and such we do not desire to claim.

We claim—

1. In a motor, the combination, with the smoke flue or pipe A, of the motor-wheel C, having air-sails $C^2$, the shaft C′, upon which said wheel is mounted, said shaft having bearings in the sides of the flue and being provided at its end with the pulley F, as described, and the deflector B, to direct the current of air to certain of the sails of the wheel C, all constructed and arranged in the manner and for the purpose set forth.

2. The combination, with a stove-pipe or other flue provided with a motor or wheel arranged and located substantially as described, of the deflector B, to direct the air to the desired place upon the motor-wheel, substantially as and for the purpose set forth.

In witness whereof we have hereunto set our hands and seals, at Springfield, Ohio, this 19th day of August, A. D. 1884.

MARTIN F. GRAHAM. [L. S.]
OWEN E. NORTH. [L. S.]

In presence of—
N. E. C. WHITNEY,
P. J. CLEVENGER.